Jan. 1, 1952 L. C. HELMS ET AL 2,580,775
GRILLE GUARD
Filed Jan. 19, 1948 2 SHEETS—SHEET 1

INVENTORS
LAURENCE C. HELMS
TRAVIS R. HELMS
GEORGE TUNGETT
JOHN K. NOONAN
BY Liverance and Van Antwerp
ATTORNEYS

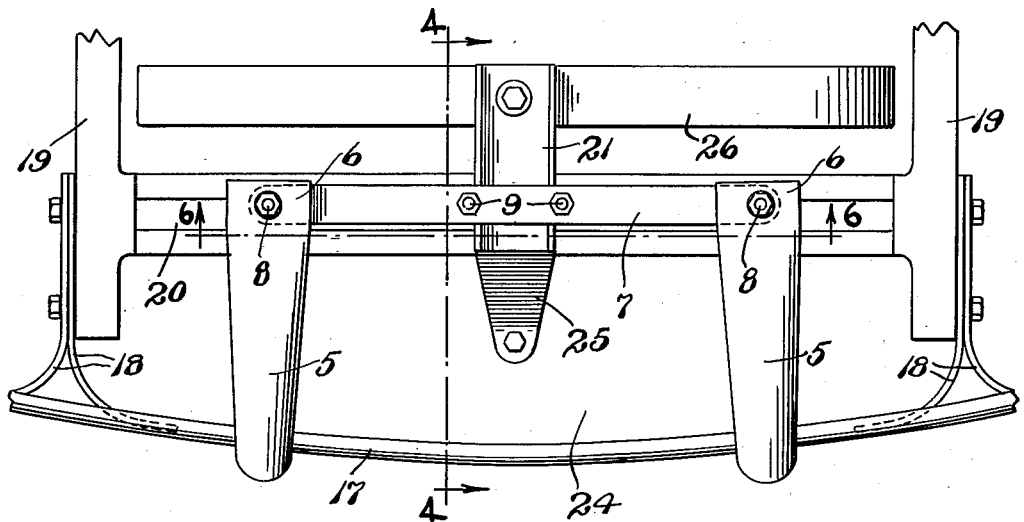
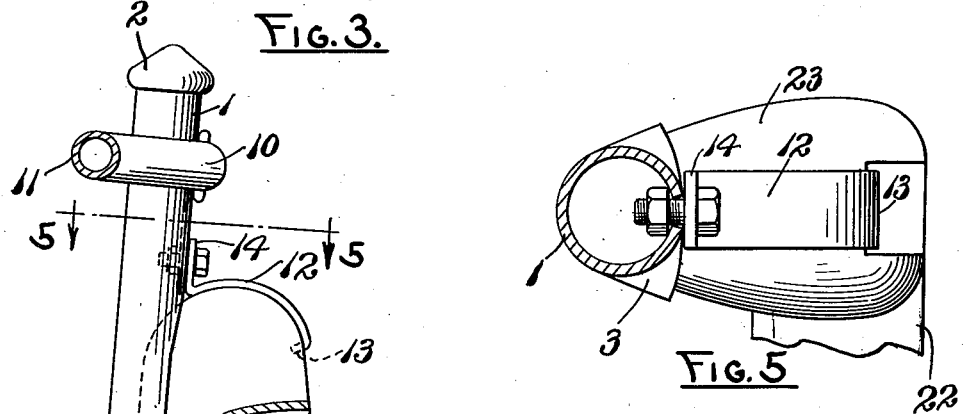
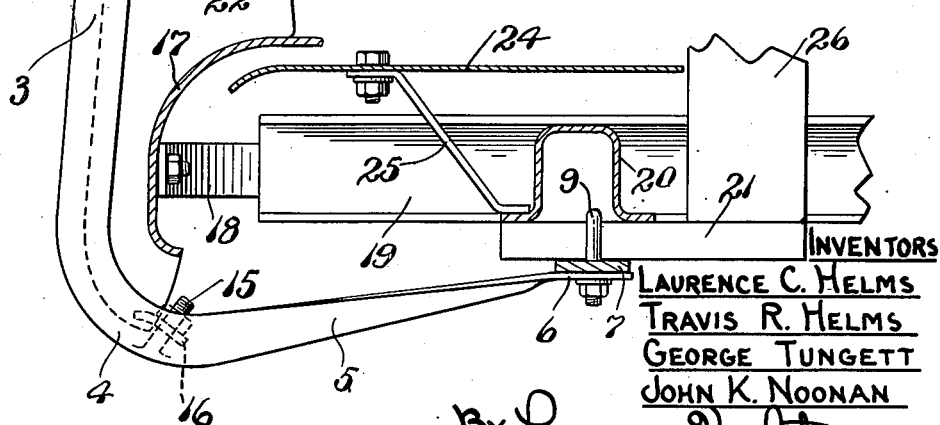

Patented Jan. 1, 1952

2,580,775

UNITED STATES PATENT OFFICE 2,580,775

GRILLE GUARD

Laurence C. Helms, Travis R. Helms, and George Tungett, Grand Rapids, and John K. Noonan, Cedar Springs, Mich., assignors to Helms Industrial Development Company, Grand Rapids, Mich., a corporation of Michigan Application January 19, 1948, Serial No. 3,104

2 Claims. (Cl. 293—65)

This invention is concerned with a novel grille guard attachment, adapted to be mounted upon the front bumper of a motor vehicle and secured in fixed relation thereto, for guarding the grille at the front of an automobile radiator against injury, and to prevent a connection of the front bumper of one car with the rear bumper of another, if one of said bumpers at a higher level than the other passes thereover.

It is an object and purpose of the present invention to provide a grille guard attachment which may be wholly assembled at the factory, and upon reaching its destination, be easily secured in its place of use for protecting the grille and radiator of a motor vehicle, and at the same time present an attractive appearance, and one which adds to the desirable appearance of the motor vehicle. Furthermore, with the present invention, economy in production and sturdiness of structure are attained with an attendant durability in use.

Figure 1:
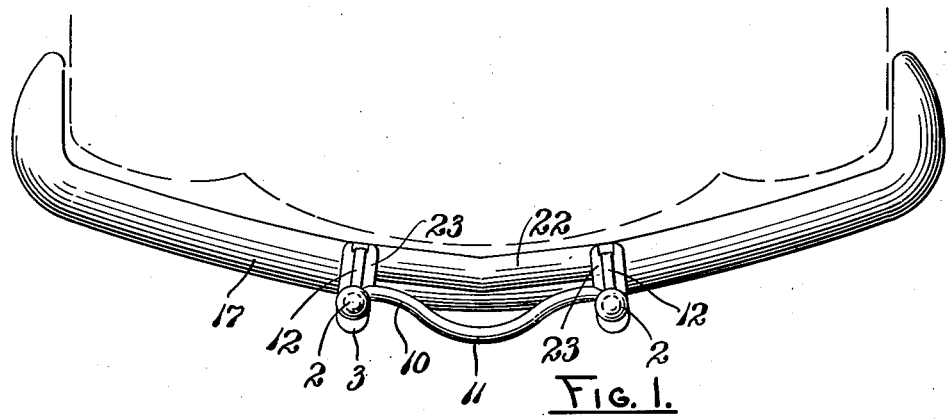
Figure 2:
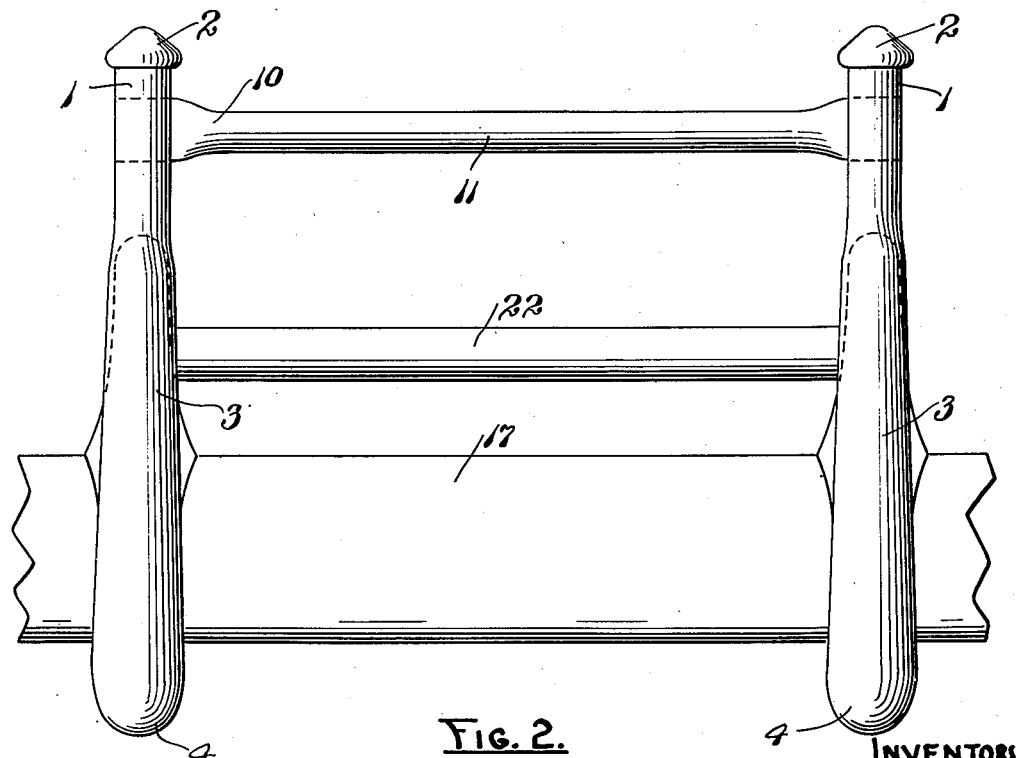
Figure 6:
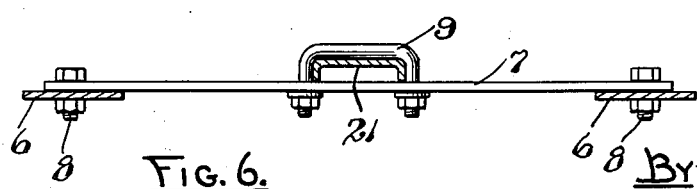

An understanding of the invention may be had from the following description, taken in connection with the accompanying drawings, in which:

Fig. 1 is a plan view of the bumper with the grille guard of my invention mounted thereon, Fig. 2 is an enlarged front elevation of the grille guard, a portion of the front bumper being shown in elevation, Fig. 3 is an under plan view of the bumper and grille guard and of the front end portions of the motor vehicle where said guard is attached, Fig. 4 is a somewhat enlarged vertical section on the plane of line 4—4 of Fig. 3, Fig. 5 is a horizontal section on the plane of line 5—5 of Fig. 4, and Fig. 6 is a transverse vertical section substantially on the plane of line 6—6 of Fig. 3.

All sectional views are taken in the directions indicated by the arrows, and like reference characters refer to like parts in the different figures of the drawings.

The grille guard attachment includes two spaced vertical posts generally of tubular form at their upper end portions, as indicated at 1, but vertically slotted at their rear sides. In the upper end of each of the posts a closing and decorative knob 2 is attached. The lower portions of the vertical parts of the posts are widened and the slot at the rear side of each correspondingly widened, making a lower section 3 of a generally channel form, which at its lower end is curved in an arc at 4 to extend to the rear in a generally horizontal arm 5, which progressively toward its rear has radial flanges extending from the intermediate portions of the arm, which flanges come together in a flat terminal plate section 6.

Between the rear end portions 6 of the two post members a flat plate 7 is located thereover and connected to the bar by bolts 8. Also, the bar 7 substantially midway between its ends is supplied with an inverted U-bolt 9 located over it, with the legs thereof passing through suitable openings in the bar 7 and receiving nuts at their lower ends.

The upper cylindrical portions 1 of the post members have a tubular rod 10, flattened at its ends and connected by bolts at the rear slots therein. The tubular rod 10 lies in a generally horizontal plane, and between its ends is curved to provide a middle forwardly curved section 11, as best shown in Fig. 1.

Each of the post members is also supplied with a connecting clip 12 of flat metal of curved form, having a free rear end terminating in a downwardly and forwardly extending short hook 13. At its front end it terminates in a vertical arm 14 through which a bolt passes, the shank of which goes through the slot of the upper tubular section 1 of the post with which the clip is associated. Also each of the post members at the rear of its lower curved section 4 is equipped with a stud 15 which is welded at its lower end to the web between the sides of the section 4. The stud 15, exteriorly threaded, has a nut thereon and below the nut it passes through a clip 16, as shown in dotted lines in Fig. 4. The assembled guard, therefore, consists of the two post members described, the bar 7 connecting their rear extremities, the bar 10 connecting them adjacent their upper ends, the clips 12 mounted one on each of the upper slotted portions 1 of the posts, and a stud 15 with a clip 16 adjacent the connected bend between the sections 3 and 5 of the post. Such assembly of cooperating parts is designed and adapted for mounting upon the front bumper of an automobile, with a secure but detachable connection thereto, and to adjacent associated parts of the automobile.

The front bumper 17 of a conventional design has attached, toward its ends, arms 18, welded or bolted thereto and extending rearwardly and bolted to the front end portions of the chassis side frame members 19 of the automobile. Near the front ends of said frame members 19 a horizontal cross member 20, of generally inverted U-shape, is located and permanently secured at its ends to said frame members. A short inverted channel section 21 is located at its rear and underneath the radiator of the automobile and extends partly under the flanges at the lower side of the channel cross bar 20 and permanently secured. The bar 7 at its middle portion passes underneath the channel 21 directly below the channel 20. The U-bolt 9 is passed over the channel 21, embracing its upper web and its side flanges as in Fig. 6, the downwardly extending legs of the U-bolt 9 passing through the bar 7 and having the nuts thereon tightened to make a firm connection. The vertical section 3 of each of the posts is located to the front of the bumper 17. The bumper 17 is equipped at the automobile factory with spaced bumperettes 23, between which a bar 22 of sheet metal folded longitudinally is located, being welded or otherwise permanently secured at its ends to said bumperettes 23, which likewise are of a sheet metal form of well known structure and which are shaped at their fronts to partly enter and nest between the sides of the lower section 3 of the post members. The manner in which the bumperettes 23 are secured to the bumper 17 is not important with relation to this invention, as they are secured in practice in many different ways. The clips 12 and 16 connect with the bumperettes at their upper and lower end portions. The hooks 13 of the upper clips 12 hook into the upper end portions of the bumperettes 23, and by tightening the bolts which pass through the arms 14, a secure drawing of each post member into tight engagement with its bumperette 23 occurs. Similarly, the lower clips 16 are brought into a tight connecting engagement with the lower ends thereof. The horizontal plate 24 back of the bumper 17, and covering the space back thereof between the bumper and the radiator, may be conveniently supported toward its front portion by an arm 25 bolted thereto and reaching to the forward flange of the inverted channel member 20. Said plate 24 extends at its rear edge underneath the grille, substantially to the radiator at 26, to the lower side of which the bar 21 is bolted or otherwise secured.

The structure described is in commercial production and is sold in increasing amounts. It has proved very practical and satisfactory. It presents an attractive appearance, is readily fabricated and its parts assembled at the factory, and upon receipt where it is to be applied to an automobile, is quickly attached.

The invention is defined in the appended claims and is to be considered comprehensive of all forms of structure coming within their scope.

We claim:

1. A grille guard structure comprising, two horizontally spaced generally vertical posts adapted to be located in front of a bumper bar of an automobile, rearwardly extending generally horizontal members at the lower ends of said posts adapted to pass below the bumper bar, a cross-bar extending between and attached to the rear ends of said rearwardly extending members, means on said cross-bar between its ends adapted to connect the cross-bar at its central portion to a forwardly extending central portion of the frame of an automobile, each vertical post at its rear side having a recess therein into which the front edge portions of bumperettes on a bumper are adapted to be received, and upper and lower attaching means on each of said posts adapted to have a releasable connection to a bumperette on an automobile bumper.

2. A structure as defined in claim 1, each of said posts at its rear side above the recess therein being vertically slotted and the means at the upper end of the recess in said post for attaching to a bumperette comprising, a clip located at the back of the post and extending rearwardly therefrom and terminating in a downwardly and forwardly extending short hook and a bolt passing through the forward end portion of said clip and through said slot in the post, said bolt receiving a nut for securing said clip to the post, and each of said posts at the lower end of the rear recess therein having a second clip adapted to extend at one end into the lower end portion of a bumperette on an automobile bumper, and means secured to said post upon which said clip is releasably secured.

LAURENCE C. HELMS.
TRAVIS R. HELMS.
GEORGE TUNGETT.
JOHN K. NOONAN.

REFERENCES CITED

The following references are of record in the file of this patent:

UNITED STATES PATENTS

| Number | Name | Date |
|---|---|---|
| 2,191,751 | Cataldo | Feb. 27, 1940 |
| 2,214,514 | Walklet | Sept. 10, 1940 |
| 2,281,215 | Van Auken | Apr. 28, 1942 |
| 2,288,978 | Talley | July 7, 1942 |